United States Patent
Suzuki et al.

(10) Patent No.: US 11,162,912 B2
(45) Date of Patent: Nov. 2, 2021

(54) ELECTRONIC APPARATUS, INDEX CALCULATING METHOD, AND COMPUTER PROGRAM PRODUCT

(71) Applicant: KABUSHIKI KAISHA TOSHIBA, Tokyo (JP)

(72) Inventors: Tomoyuki Suzuki, Kanagawa (JP); Tomonao Takamatsu, Kanagawa (JP); Kenji Hirohata, Tokyo (JP); Tomoko Monda, Kanagawa (JP); Yuki Numata, Tokyo (JP)

(73) Assignee: KABUSHI KI KAISHA TOSHIBA, Tokyo (JP)

( * ) Notice: Subject to any disclaimer, the term of this patent is extended or adjusted under 35 U.S.C. 154(b) by 1246 days.

(21) Appl. No.: 15/258,228

(22) Filed: Sep. 7, 2016

(65) Prior Publication Data
US 2017/0074813 A1 Mar. 16, 2017

(30) Foreign Application Priority Data

Sep. 11, 2015 (JP) .............................. JP2015-180094
Aug. 8, 2016 (JP) .............................. JP2016-155611

(51) Int. Cl.
*G01N 25/72* (2006.01)
*G01K 3/10* (2006.01)

(52) U.S. Cl.
CPC .............. *G01N 25/72* (2013.01); *G01K 3/10* (2013.01)

(58) Field of Classification Search
CPC . H04J 1/00; F02B 77/06; G01N 25/72; G01K 3/10; G01K 7/42; F01P 9/00; F24F 1/0007; G05D 23/193; H01M 8/0631; F04D 27/02
See application file for complete search history.

(56) References Cited

U.S. PATENT DOCUMENTS

| | | | | |
|---|---|---|---|---|
| 2002/0099482 A1* | 7/2002 | Reese, II | ................. | F01P 11/14 701/31.4 |
| 2003/0075120 A1* | 4/2003 | Brace | ........................ | F01P 9/00 123/41.44 |
| 2004/0079094 A1* | 4/2004 | Kasai | .................... | F24F 1/0007 62/186 |

(Continued)

FOREIGN PATENT DOCUMENTS

| | | | | |
|---|---|---|---|---|
| GB | 2470465 A | * | 5/2010 | .............. F24F 11/00 |
| JP | 2005-215794 | | 8/2005 | |
| JP | 2008-034715 | | 2/2008 | |
| JP | 2009-217776 A | | 9/2009 | |

(Continued)

OTHER PUBLICATIONS

Kenji Hirohata et al., "Health Monitoring Technology for Digital Equipment", *Toshiba Review*, vol. 64, No. 8 (2009). pp. 8-11.

*Primary Examiner* — Regis J Betsch
*Assistant Examiner* — Kaleria Knox
(74) *Attorney, Agent, or Firm* — Finnegan, Henderson, Farabow, Garrett & Dunner L.L.P.

(57) ABSTRACT

According to one embodiment an electronic apparatus includes a housing, a heat generating element, a plurality of sensors, and an index calculator. The heat generating element is housed in the housing. The index calculator calculates an index corresponding to a physical quantity or an index indicating performance of the electronic apparatus, based on a correlation between detected values of the sensors and the index.

12 Claims, 8 Drawing Sheets

(56) References Cited

U.S. PATENT DOCUMENTS

| | | | |
|---|---|---|---|
| 2006/0222045 A1* | 10/2006 | Byquist | G01K 7/42 374/109 |
| 2007/0054164 A1* | 3/2007 | Yamamoto | H01M 8/0631 48/61 |
| 2007/0250292 A1* | 10/2007 | Alagappan | C10B 55/00 702/184 |
| 2009/0242186 A1 | 10/2009 | Koshiyama | |
| 2009/0323277 A1* | 12/2009 | Hosokawa | G06F 1/203 361/679.54 |
| 2010/0299099 A1 | 11/2010 | Yamaoka et al. | |
| 2012/0166142 A1 | 6/2012 | Maeda et al. | |
| 2015/0086328 A1* | 3/2015 | Tsutsui | F04D 27/02 415/47 |
| 2016/0187175 A1 | 6/2016 | Suzuki et al. | |
| 2017/0059190 A1* | 3/2017 | Stefanski | G05D 23/193 |
| 2017/0074813 A1 | 3/2017 | Suzuki et al. | |

FOREIGN PATENT DOCUMENTS

| | | | | |
|---|---|---|---|---|
| JP | 2009-238020 A | 10/2009 | | |
| JP | 2010-009539 | 1/2010 | | |
| JP | 2010-271948 | 12/2010 | | |
| JP | 2011-059790 | 3/2011 | | |
| JP | 2011-132862 | 7/2011 | | |
| JP | 201132862 | * 7/2011 | | F02B 77/08 |
| JP | 2016-126504 | 7/2016 | | |
| JP | 2017-54498 | 3/2017 | | |
| WO | WO 2014/147691 | 9/2014 | | |

* cited by examiner

ELECTRONIC APPARATUS, INDEX CALCULATING METHOD, AND COMPUTER PROGRAM PRODUCT

CROSS-REFERENCE TO RELATED APPLICATIONS

This application is based upon and claims the benefit of priority from Japanese Patent Application No. 2015-180094, filed on Sep. 11, 2015, and Japanese Patent Application No. 2016-155611, filed on Aug. 8, 2016; the entire contents of which are incorporated herein by reference.

FIELD

Embodiments relate to electronic apparatuses, index calculating methods, and computer program products.

BACKGROUND

A known electronic device determines a possible cause of an anomaly as increase in temperature through comparison of detected temperatures.

It is significant to develop an electronic device which allows users to conveniently identify an anomaly or an indication of anomaly in an electronic device or in ambient environment.

DETAILED DESCRIPTION

According to an embodiment, an electronic apparatus includes a housing, a heat generating element, a plurality of sensors, and an index calculator. The heat generating element is accommodated in the housing. The index calculator is configured to calculate an index corresponding to a physical quantity or an index indicating performance of the electronic apparatus, based on a correlation between detected values of the sensors and the index.

The following discloses exemplary embodiments of the present invention. Configurations and control (technical features) of the embodiments to be described hereunder and effects and results achieved by the configurations and control are illustrative only. The embodiments and modifications to be illustrated hereunder include same or like elements. In the following, same or like elements are identified by common reference numerals and descriptions thereof will not be duplicated.

First Embodiment

Figure 1:
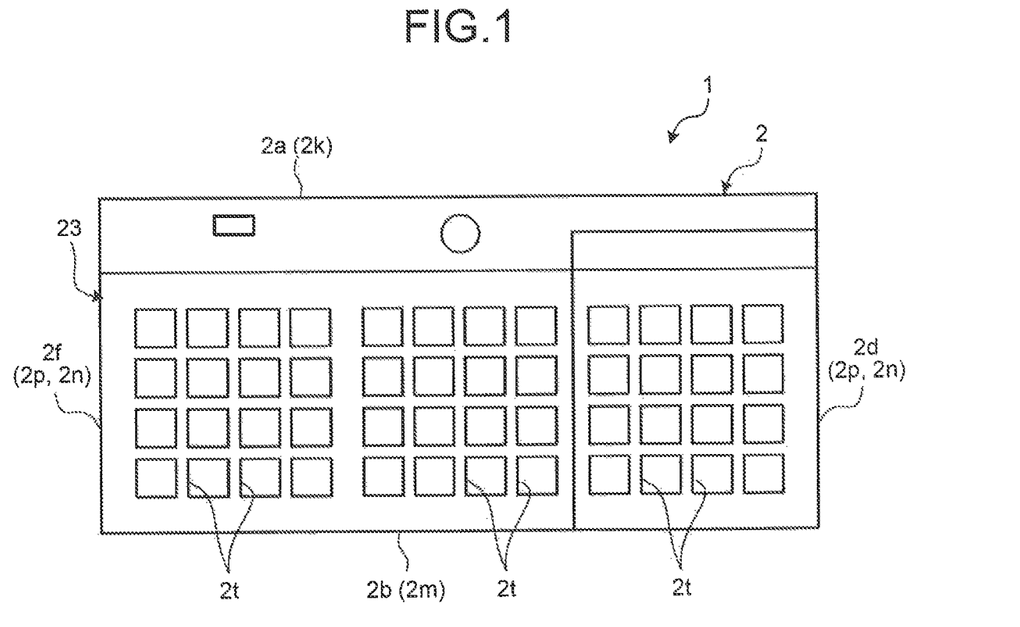
FIG. 1 is a schematic and exemplary front elevational view of an electronic apparatus according to a first embodiment.
Figure 2:
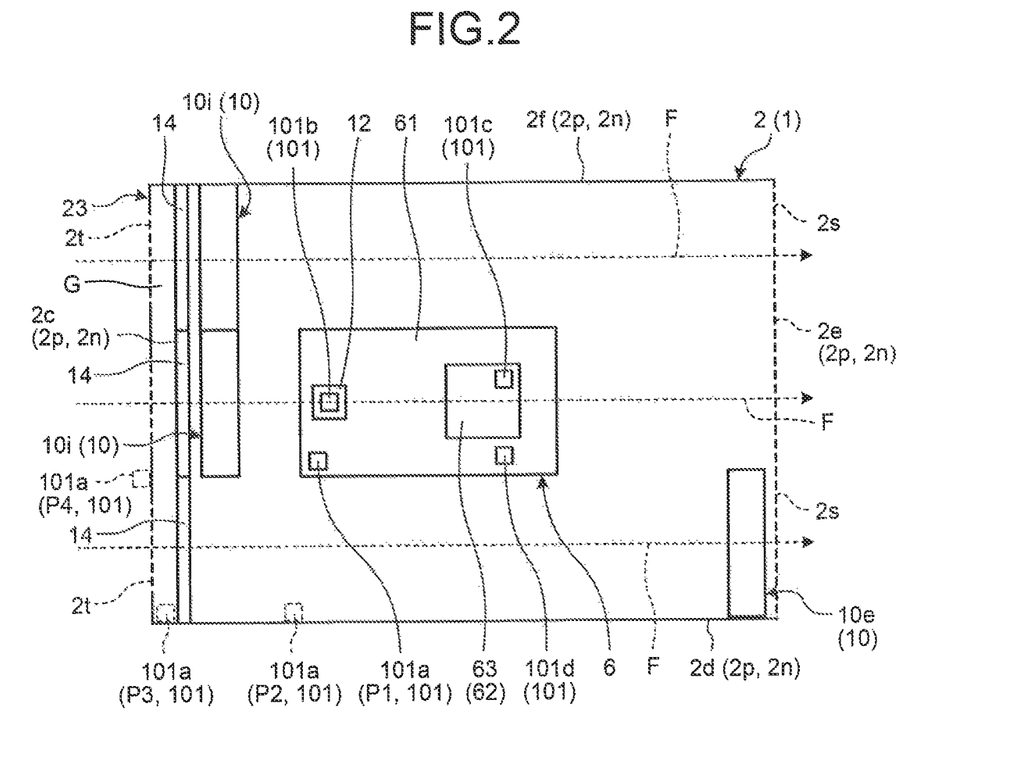
FIG. 2 is a schematic and exemplary plan view of the configuration of elements inside a housing of the electronic apparatus according to the first embodiment.

FIG. 1 is a schematic and exemplary front elevational view of an electronic apparatus 1 according to a first embodiment. FIG. 2 is a schematic and exemplary plan view illustrating the configuration of elements inside a housing 2 of the electronic apparatus 1. The electronic apparatus 1 represents a server. The electronic apparatus 1 includes the housing 2 of a flat rectangular parallelepiped shape. The housing 2 has a face 2a and a face 2b opposite to the face 2a, The face 2a and the face 2b each expand orthogonally to or intersecting the thickness of the housing 2. The face 2a and the face 2b extend substantially in parallel with each other. The housing 2 has four faces 2p that expand across the face 2a and the face 2b. All of the four faces 2p intersect or are orthogonal to the face 2a and the face 2b. The face 2a may also be referred to as a top face, the face 2b may also be referred to as a bottom face, and the faces 2p may also be referred to as side faces or peripheral faces. The housing 2, when viewed from the face 2a, has four ends 2c to 2f. The ends 2c to 2f may also be referred to, for example, edges or sides. The ends 2c and 2e are exemplary short sides. The ends 2d and 2f are exemplary long sides.

The housing 2 has walls 2k, 2m, and 2n. Specifically, the wall 2k has the face 2a. The wall 2m has the face 2b. The walls 2n have the faces 2p. The wall 2k and the wall 2m expand orthogonally to or intersecting the thickness of the housing 2. The wall 2k and the wall 2m extend substantially in parallel with each other. The housing 2 has the four walls 2n disposed to expand across the wall 2k and the wall 2m. All of the four walls 2n intersect, or are orthogonal to the wall 2k and the wall 2m. The wall 2k may also be referred to as a top wall, the wall 2m may also be referred to as a bottom wall, and the walls 2n may also be referred to as side walls or peripheral walls.

One side of the housing 2 adjacent to the end 2c or the left wall 2n in FIG. 2 is covered width a detachable covering member 23 with a gap G. The covering member 23 is provided with openings 2t. The covering member 23 may also be referred to as an outer cover. The housing 2 is provided with an opening 2s on the side opposite to the wall 2n covered with the covering member 23, or the right wall 2n in FIG. 2.

The wall 2n includes filters 14 facing the openings 2t, Fans 10i and the filters 14 are designed to be detachable from the housing 2 with the covering member 23 detached. This facilitates user's maintenance of the fans 10i and the filters 14. In the present embodiment, the filters 14 constitute one of the walls 2n. The wall 2n and the filters 14 may nonetheless be individually disposed. The housing 2 can be an assembly of multiple parts or components (separate parts or components). The housing 2 may include members disposed thereinside, such as a member constituting a shell of the housing 2.

The electronic apparatus 1 includes the fans 10 (fans 10i and 10e). The fans 10 generate airflows through the housing 2. In the example illustrated in FIG. 2, three fans 10 each generate an airflow from left to right. The fans 10i are disposed inside the housing 2 closer to the end 2c than to the end 2e, facing the end 2c and the filters 14. The fans 10i may also be referred to as intake fans. The fan 10e is disposed inside the housing 2 closer to the end 2e than to the end. 2c and facing the and 2e and the opening 2s. The fan 10e may also be referred to as an exhaust fan. With such a configuration, an airflow F from left to right in FIG. 2 is generated in the housing 2. The airflow F is introduced into the housing 2 through the openings 2t and the filters 14 and discharged from the housing 2 to outside through the opening 2s.

The housing 2 accommodates a substrate assembly 6. The substrate assembly 6 includes a substrate 61 and components 62 and 12. The components 62 and 12 are disposed on the substrate 61. The component 62 corresponds to a heat generating element. The component 62 may, for example, be an electronic device such as a central processing unit (CPU) or a controller. A cooling element 63 is disposed on the opposite side of the substrate 61 from the component 62. The cooling element 63 may also be referred to as a heat sink or a heat dissipating member. The cooling element 63 may be formed, for example, of a metal material with high thermal conductivity. The cooling element 63 may be provided with recesses or protrusions (uneven surfaces) for an increased surface area. A heat transport mechanism, such as a heat pipe filled with refrigerant, may be thermally connected with the cooling element 63. To enhance adhesion and thermal conductivity, a heat transfer member (not illustrated) with elasticity and high thermal conductivity may be disposed between the cooling element 63 and the component 62. The component 12 may be an electronic component that can conduct current or a metal material that has high thermal conductivity but does not conduct current. Alternatively, a heat value of the component 12 or a thermal flux in the component 12, for example, may be controlled to remain constant or vary as prescribed by a heating mechanism such as an electric resistor or a cooling mechanism such as a Peltier element.

The housing 2 includes multiple sensors 101. Values detected by toe sensors 101 are used for calculating an index that corresponds to a physical quantity indicating a phenomenon or an index that indicates performance. In the present embodiment, four sensors 101 (101a to 101d) are, for example, temperature sensors. The four sensors 101 may be supported directly or indirectly on the substrate 61. Indirect support herein refers to the support for the sensors is a part different from the substrate 61. The sensors 101 may be any type of sensor other than the temperature sensor, including a current sensor, a humidity sensor, an acceleration sensor, a flow rate sensor, and a pressure sensor. Additionally, the sensors 101 may include sensors for detecting physical quantities different from each other.

The sensor 101a is mounted directly on a surface of the substrate 61 with no intervening part therebetween. The sensor 101a is spaced apart from the components 62 and 12, facing the air intake fan 10i. The sensor 101a is disposed farther apart from the component 62 as the heat generating element than the other sensors 101 or farthest, among all the sensors 101. The sensor 101a is disposed more upstream of the airflow F than the component 62. Additionally, the sensor 101a is disposed closer to the fan 10i than the other sensors 101 or closest among all the sensors 101.

Specifically, in the present embodiment, the sensor 101a is disposed so as to be more susceptible to environmental temperature than the other sensors 101 or most susceptible among all the sensors 101, or to indicate substantial environmental temperature outside the housing 2. The term "environmental temperature", as used herein, refers to ambient temperature not affected by the heat from the heat generating element and may also be referred to as outside air temperature.

In addition to a position P1 on the substrate 61 described above, the sensor 101a may instead be disposed at, for example, a position P2 in contact with the wall in inside the housing 2, at a position 23 in the gap P between the covering member 23 and the filters 14 (wall 2n), or at a position P4 outside the housing 2. The position 22 may be inside any wall other then the wall 2n.

The sensor 101b is mounted on the component 12. The sensor 101b is spaced apart from the heat generating component 62. The sensor 101b is disposed more upstream of the airflow F than the component 62. Additionally, the sensor 101b is disposed, facing the air intake fan 10i. If the component 12 generates heat, the greater the air volume of the fan 10i (flow rate of the airflow F), the greater the heat value transmitted from the component 12 to the airflow F. Thus, the amount of heat conduction from the component 12 to the sensor 101b varies according to the air volume of the fan 10i, so that the detected value of the sensor 101b is easily affected by the air volume of the fan 10i. In the present embodiment, the sensor 101b is disposed so as to be more susceptible to the air volume, of the fan 10i (flow rate of the airflow F) than the other sensors 101 or most susceptible among all of the sensors 101. The sensor 101b may be mounted near the component 12 on the substrate 61. The sensor 101b may be disposed more downstream of the airflow F than the component 62.

The sensor 101c is mounted on the cooling element 63. The detection by the sensor 101c is susceptible to changes in the cooling performance of the cooling element 63. The cooling performance of the cooling element 63 is degraded by, for example, dust deposits, corrosion, and reduced contact with the cooling element. The contact with the cooling element can be lessened by for example, external impact, heating, and evaporation of a heat transfer member (bonding member). In the present embodiment, the sensor 101c is disposed so as to be more susceptible to the cooling performance of the cooling element 63 than the other sensors 101 or most susceptible among all of the sensors 101.

The sensor 101d is disposed near the component 62 generating heat. More specifically, the sensor 101d is disposed closer to the component 62 than the sensors 101a and 101b or closest, to the component 62 among all the sensors 101a, 101b, and 101d but the sensor 101c. The detection of the sensor 101d is susceptible, to changes in the heat value of the component 62. In the present embodiment, the sensor 101d is disposed so as to be more susceptible to the heat value of the component 62 than the other sensors 101 or most susceptible among all of the sensors 101.

The sensors 101c and 101d may be disposed not to be directly exposed to the airflow F, specifically, so as to be less susceptible to the flow rate of the airflow F. In this case, a shield that blocks the airflow F or a cover (not illustrated) for covering the sensors 101c and 101d, for example, may be disposed inside the housing 2, on the substrate 61, or around the sensors 101c and 101d. Alternatively, the cooling element 63 or the substrate 61 on which the sensors 101c and 101d are mounted may be used as a shield for blocking the airflow F. Still alternatively, not only the sensors 101c and 101d but also the sensors 101a and 101b may be provided with elements for reducing an influence from heat or the airflow F.

The following describes a method for calculating an index using the detected values of the sensors 101. The index (indicator, exponent) may be a numerical value corresponding to a physical quantity that indicates any of various phenomena or a numerical value indicating any of various types of performance exhibited by the electronic apparatus 1. Based on the index represented by, for example, a numeric value or a level, the user can know, for example, a phenomenon occurring inside or outside the electronic apparatus 1 and changes in various types of performance of the electronic apparatus 1. Examples of physical quantities indicated by indices include, but should not be limited to, temperature, flow rate, electric power, electric energy, current value, and voltage. Examples of performance indicated by the indices include, but should not limited to, numeric values, ratios, frequencies, ranks, and levels indicating degrees of various types of performance, such as clogging of the filters 14 or defects in the cooling element 63. The indices can be non-dimensionalized. Calculated indices have only to be output in a form that enables the user to identify or determine the indices visually or aurally, and the calculated index values do not have to be output.

Consider an index I that can be defined by, for example, the following expression (1):

$$I = a0 + a1 \cdot x1 + a2 \cdot x2 + \ldots + an \cdot xn$$

where suffixes 0, 1, 2, ..., and n represent identifiers of the sensors 101; n represents the number of sensors 101; x1, x2, ..., and xn represent detected values of the sensors 101; and a0, a1, a2, . . . ; and an represent coefficients set corresponding to the respective detected values of the sensors 101. The coefficients a0, a1, a2, . . . , and an represent the correlation between the detected values of the sensors 101 and the index I, and are acquired and set in advance through experiments or simulation. The correlation (coefficients) between the detected values of the sensors 101 and the index I may be acquired by machine learning technique including Bayesian network, support vector machine, structural equation modeling, and regression analysis, for example. The index I is defined to be a dependent variable having each of the detected values x1, x2, ..., and xn of the sensors 101 as an independent variable. As evident from the expression (1), the index I is calculated, on the basis of the detected values of the sensors 101. Specifically, the index I is calculated on the basis of the correlation between the detected values x1, x2, . . . , and an of the sensors 101 and the index I. Through earnest researches, the inventors have found that the index I should be calculated on the basis of the detected values of two or more, or preferably at least three or more sensors 101. Specifically, the inventors have found that index accuracy is increased by calculation based on the detected values of a larger number of the sensors 101, that is, two sensors rather than one sensor 101, three or more sensors rather than two sensors 101. The three detected values may, for example, be a detected value corresponding to environmental temperature, a detected value corresponding to the flow rate of the airflow F, and a detected value corresponding to the heat value of the heat generating element. The detected value, of the sensor 101a is an exemplary detected value corresponding to the environmental temperature. The detected value of the sensor 101b is an exemplary detected value corresponding to the flow rate of the airflow F (air volume of the fan 10i). The detected value of the sensor 101d is an exemplary detected value corresponding to the heat value of the heat generating element.

The detected values of the sensors 101 may be used for the calculation of multiple indices Ii. Specifically, m Indices Ii may, for example, be defined by the following expression. (2):

$$Ii = ai0 + ai1 \cdot x1 + ai2 \cdot x2 + \ldots + ain \cdot xn$$

where
the suffix i (i–1 to m) represents an identifier of the index; and ai0, ai1, ai2, . . . , and ain represent coefficients. The coefficients a0, ai1, ai2, . . . , and ain of the indices Ii represent the correlation between the detected values of the sensors 101 and the indices Ii and are acquired and set in advance through experiments or simulation. The correlation (coefficients) between the detected values of the sensors 101 and the index Ii may be acquired by machine learning technique including Bayesian network, support vector machine, structural equation modeling, and regression analysis, for example. The indices Ii are defined to be dependent variables having the detected values x1, x2, . . . , and an of the sensors 101 as independent variables. The number n of sensors 101 may be equal to or different from the number m of indices Ii. Each term of the polynomial expression the indices Ii may include, for example, powers (e.g., squares) of the detected values x1, x2, . . . , and xn of the sensors 101, in place of the detected values x1, x2, . . . , and xn of the sensors 101. In this case, the powers of the detected values x1, x2, . . . , and xn assume the independent variables. Thus, the indices should not be limited to the examples above and may be dependent variables based on the independent variables corresponding to the detected values x1, x2, . . . , and xn of the sensors 101.

Consider products of the independent variables and the coefficients in expressions (1) and (2), that is, a1·x1, a2·x2, . . . , and an·xn in expression (1) and ai1·x1, ai2·x2, . . . and ain·xn in expression (2). The greater the values of the products or the terms in expressions (1) and (2), the greater the values of the indices. Thus, a degree of influence of the independent variables (detected values of the sensors 101) on the indices can be determined from ratios of the values of the products of the independent variables and the coefficients (terms) to the values of the indices.

In addition, the inventors' earnest researches have resulted in the following findings on the products of the independent variables and the coefficients when the detected values of the sensors 101 are used for the calculation of the indices Ii. Specifically, when one of the sensors 101 that corresponds to an independent variable resulting in a maximum product in one index (e.g., an index I1) differs from one of the sensors 101 that corresponds to an independent variable resulting in a maximum product in another index (e.g., an index I2), the accuracy of the indices Ii is further enhanced. The sensors 101 (101a to 101d) are disposed on the basis of these findings. In the present embodiment, the position of the sensor 101a is adjusted and set such that the independent variable and the coefficient (term) corresponding to the detected value of the sensor 101a yields a maximum product among the products in the polynomial expressing the index corresponding to the environmental temperature. The position of the sensor 101b is adjusted and set such that the independent variable and the coefficient (term) corresponding to the detected value of the sensor 101b yields a maximum product among the polynomial expressing the index corresponding to the air volume of the fan 10i. The position of the sensor 101c is adjusted and set such that the independent variable and the coefficient (term) corresponding to the detected value, of the sensor 101c yields a maximum product among the products in the polynomial expressing the index indicating the cooling performance of the cooling element 63. The position of the sensor 101d is adjusted and set such that the independent variable and the coefficient (term) corresponding to the detected value of the sensor 101d yields a maximum product among the products in the polynomial expressing the index indicating the heat value of the heat generating component 62. The index I1 is an exemplary first index and the index I2 is an exemplary second index.

Figure 3:
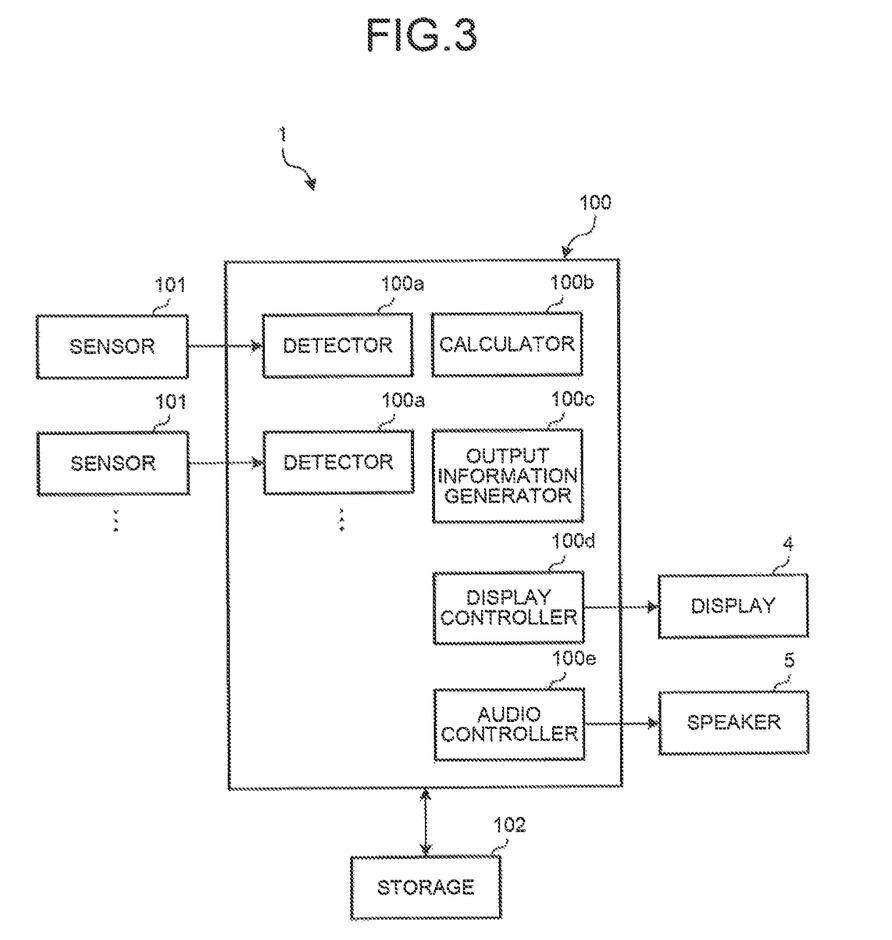
FIG. 3 is an exemplary and schematic block diagram of the electronic apparatus according to the first embodiment.

FIG. 3 is a block diagram of a controller 100 that calculates the indices on the basis of the detected values of the sensors 101 and control the respective elements on the basis of the calculated indices. The controller 100 includes a detector 100a, a calculator 100b, an output information generator 100c, a display controller 100d, and an audio controller 100e. The controller 100 may be embodied by, for example, a CPU or a controller.

The arithmetic operations and control performed by the controller 100 may be executed by software or hardware. The arithmetic operations and control performed by the controller 100 may include arithmetic operations and control performed by software and arithmetic operations and control performed by hardware. By software processing, the controller 100 reads a program from, for example, a read only memory (ROM), a hard disk drive (HDD), a solid state drive (SSD), or a flash memory and executes the program. The controller 100 operates according to the program and functions as, for example, the detector 100a, the calculator 100b, the output information generator 100c, the display controller 100d, and the audio controller 100e. In this case, the program includes modules that correspond to the detector 100a, the calculator 100b, the output information generator 100c, the display controller 100d, and the audio controller 100e. The program may be recorded and provided in an installable or executable file format on a computer-readable recording medium such as a compact disc read only memory (CD-ROM), a flexible disk (FD), a compact disc recordable (CD-R), and a digital versatile disc (DVD). The program may be stored in the storage of a computer connected to a communication no and provided by being downloaded via the network. The program may be incorporated in advance in, for example, the ROM. The controller 100, when configured in whole or in part by hardware, may include a field programmable gate array (FPGA) or an application specific integrated circuit (ASIC).

The detector 100a acquires a detected value as a result of the detection by the sensors 101. The calculator 100b calculates the index on the basis of the detected value acquired by the detector 100a, calculates each term (product of the independent variable and the coefficient) of the index, compares the index with a threshold for the index, and performs various types of arithmetic operations for the index calculations. The output information generator 100c generates output information for execution of a prescribed output. The output information may include output information corresponding to a result of arithmetic operations and supplementary output information for outputting the result of arithmetic operations. The display controller 100d controls a display 4 to display an image corresponding to the generated output information. The audio controller 100e controls a speaker 5 to output audio corresponding to the generated output information. For the display output, the output information generator 100c and the display controller 100d are an exemplary output controller. For the audio output, the output information generator 100c and the audio controller 100e are an exemplary output controller. The result of arithmetic operations by the calculator 100b may be used as part of a reliability availability serviceability (RAS) function. The calculator 100b is an exemplary index calculator.

A storage 102 may include, for example, a storage element or a storage device such as random access memory (RAM), ROM, HDD, SSD, or flash memory. The program is stored in a nonvolatile storage element or storage device, such as ROM, HDD, SSD, and flash memory. The storage 102 stores, for example, data used for the control by the controller 100, data used in the arithmetic operations by the calculator 100b, the results of an operations, and the output information. The coefficients for use in the calculation of the indices may be written to the program or stored in the storage 102 separately from the program. The coefficients may be set to be variable.

The display 4 is an exemplary display unit. The display 4 is, for example, a liquid crystal display (LCD). The speaker 5 an exemplary audio output unit. The display 4 and the speaker 5 are an exemplary output unit. The display 4 and the speaker 5 may be included in the electronic apparatus 1 or may be external devices.

Figure 4:
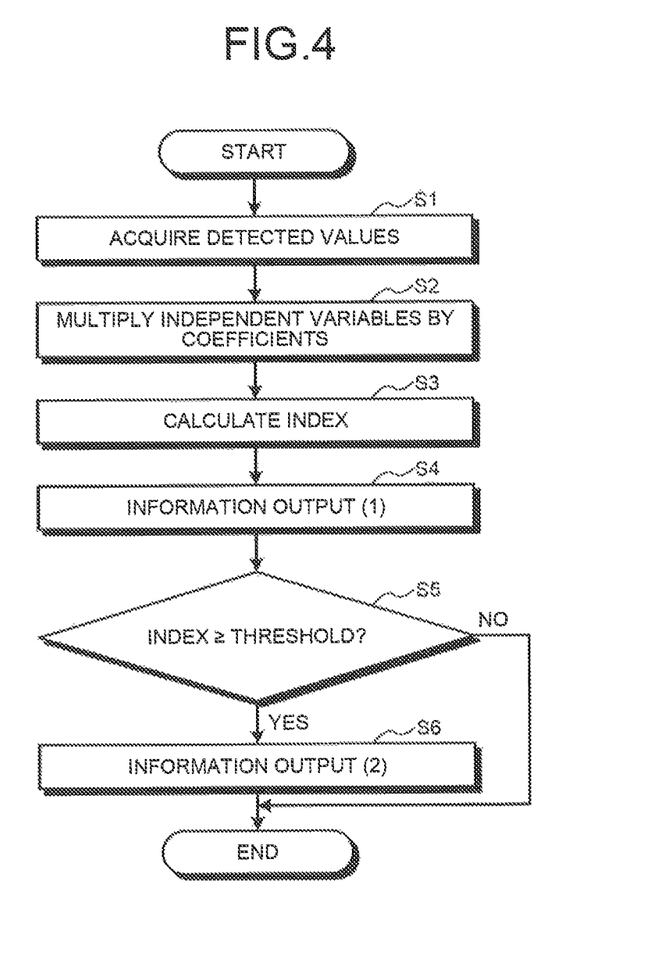
FIG. 4 is an exemplary flowchart of arithmetic operations performed in the electronic apparatus according to the first embodiment.

FIG. 4 illustrates exemplary arithmetic operations performed by the controller 100. The detector 100a acquires detected values from the results of detection by the sensors 101 (S1). The calculator 100b then calculates products of independent variables and coefficients on the basis of the detected values or the sensors 101 (S2) an calculates a sum of the products as an index (S3).

The output information generator 100c generates output information on the products and the index calculated at S2 and S3. The display controller 100d controls the display 4 so as to display the output information. The audio controller 100e controls the speaker 5 so as to output audio in accordance with the output information. Specifically, it implements an information output (1) (S4).

The calculator 100b compares the index with a predetermined threshold for the index (S5). If the index is found to be equal to or greater than the threshold at S5 (Yes at S5), the output information generator 100c generates the output information indicating occurrence of anomaly or to prompt a user to deal with the anomaly, in accordance with an attribute or a value of the index. The display controller 100d controls the display 4 so as to display the output information. The audio controller 100e controls the speaker 5 so as to output audio in accordance with the output information. Specifically, the audio controller 100e implements an information output (2) (S6). With No at S5, step S6 is omitted.

Figure 5:
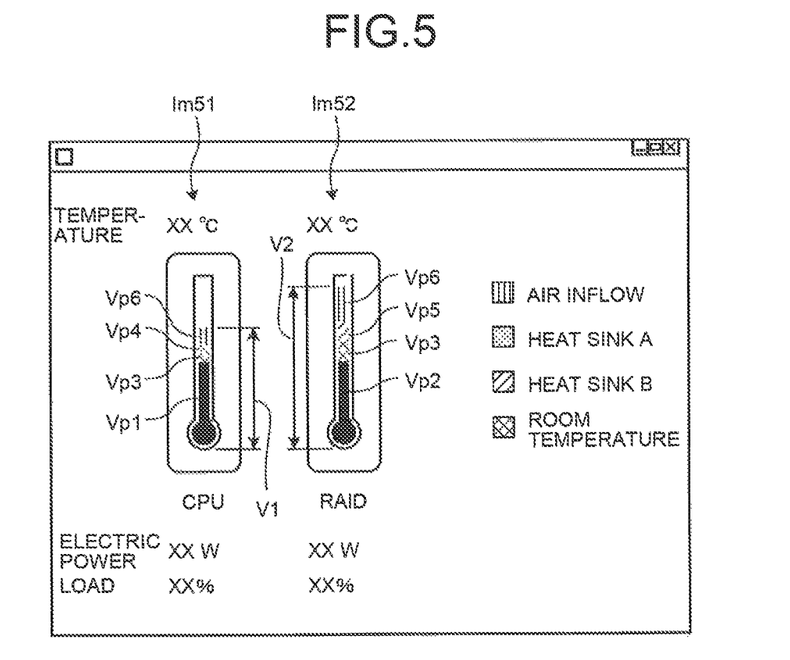
FIG. 5 is a schematic diagram illustrating an exemplary form of display of indices calculated, by the electronic apparatus according to the first embodiment on a display unit.

FIG. 5 is a diagram illustrating an exemplary display of temperatures of two components 62 as an index. In FIG. 5 the electronic apparatus 1 includes two sensors 101d that are disposed near the components 62 generating heat and that are susceptible to changes in the heat values of the components 62. A first one of the sensors 101d is disposed near a CPU as one of the components 62 and a second one of the sensors 101d is disposed near the storage 102 (RAID) as the other component 62. There are two indices, one corresponding to the temperature of the CPU and the other corresponding to the temperature of the RAID. Images Im51 and Im52 of bar graphs (cumulative bar graphs) schematically depicting thermometers indicate values V1 and V2 of the indices and values Vp1 to Vp6 of the products (terms). Vp1 represents a value of a product of a detected value, of the first sensor 101d affected greatly by the heat value of the CPU as the component 62 and a corresponding coefficient. Vp2 represents a value of a product of a detected value of the second sensor 101d affected greatly by the heat value of the RAID as the component 62 and a corresponding coefficient. Vp3 represents a value of a product of a detected value of the sensor 101a affected greatly by room temperature (environmental temperature) and a corresponding coefficient. Vp4 represents a value of a product of a detected value, of the sensor 101c affected greatly by cooling performance of a heat sink A (cooling element 63) and a corresponding coefficient, Vp5 represents a value of a product of a detected value of the sensor 101c affected greatly by cooling performance of a heat sink B (cooling element 63) and a corresponding coefficient. Vp6 represents a value of a product of a detected value of the sensor 101b affected greatly by an air inflow (air volume of the fan 10i) and a corresponding coefficient. From the display of the index values illustrated in FIG. 5 the user can know the temperatures of the components 62 generating heat. From the display of the values of the products (terms) together with the index values illustrated in FIG. 5, the user can also know the degree of influence on the respective elements from the increased temperatures of the components 62. The display illustrated in FIG. 5 shows, in addition to the indices, the temperatures, electric power (power consumption), and load (load factors), so that the user can easily know current states or possible causes of the increase in temperatures of the components 62 when the increase occurs.

Figure 6:
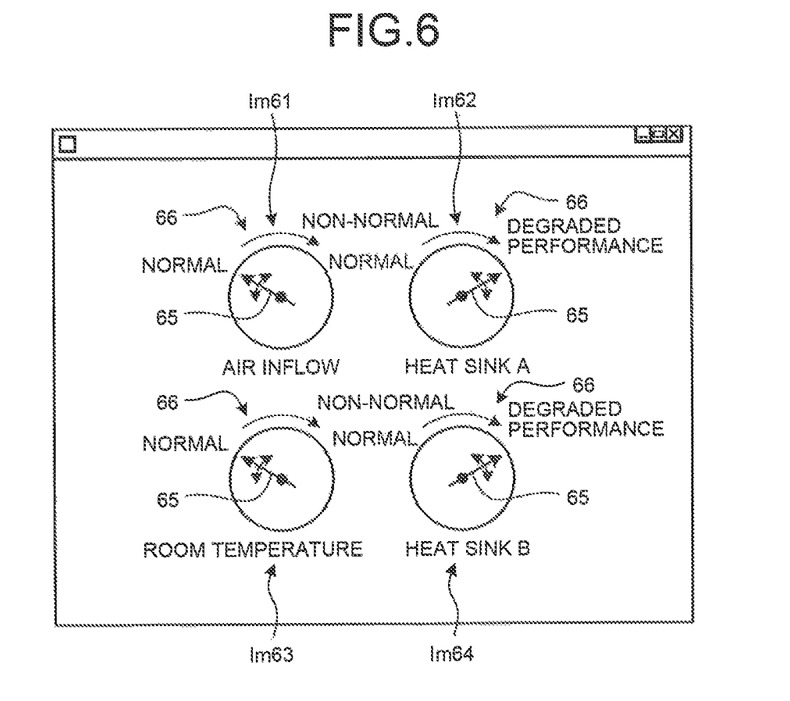
FIG. 6 is a schematic diagram illustrating another exemplary form of display of the indices calculated by the electronic apparatus according to the first embodiment on the display unit, as different from what is illustrated in FIG. 5.

A display illustrated in FIG. 6 shows an index corresponding to the room temperature, in addition to indices indicating performance (air inflow) of the fan 10i, cooling performance of the heat sink A (cooling element 63), and cooling performance of the heat sink B (cooling element 63), In FIG. 6 images Im61 to Im64 of schematic tachometers indicate indices. Each of the images Im61 to Im64 includes a pointer 65 indicating the value of the index and a scale 66. In FIG. 6, for example, the pointer 65 indicates normalcy when it points substantially ten-o'clock position and the pointer 65 indicates anomaly or degraded performance when it points any other position, such that the further clockwise position from the normal position the pointer 65 points, the larger the anomaly or the lower the performance it indicates. From the display of the index values as illustrated in FIG. 6, the user can know a current physical quantity indicating a phenomenon and current performances of various types of elements.

Figure 7:
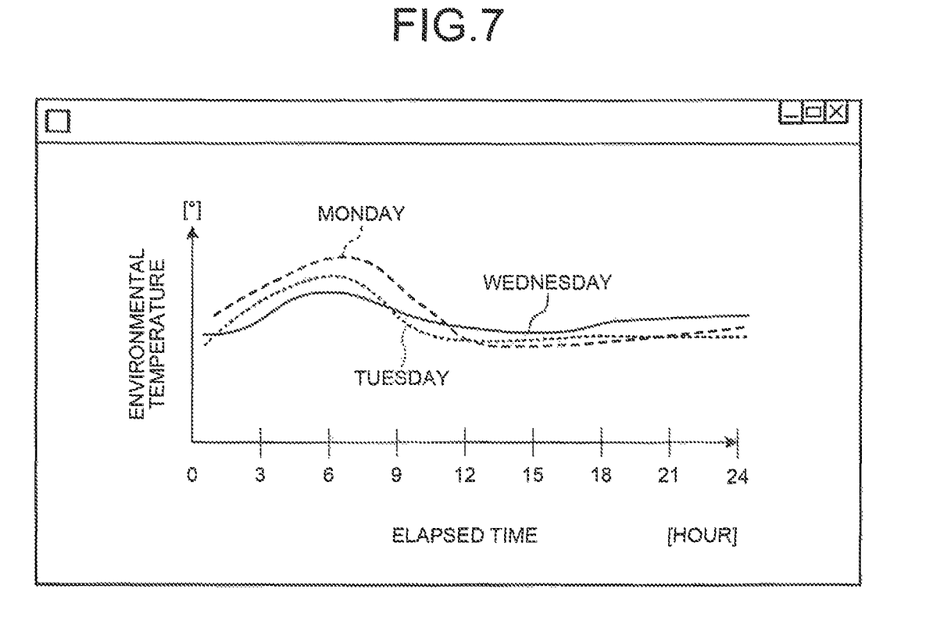
FIG. 7 is a schematic diagram illustrating still another exemplary form of display of the indices calculated by the electronic apparatus according to the first embodiment on the display unit, as different from what are illustrated in FIGS. 5 and 6.
Figure 8:
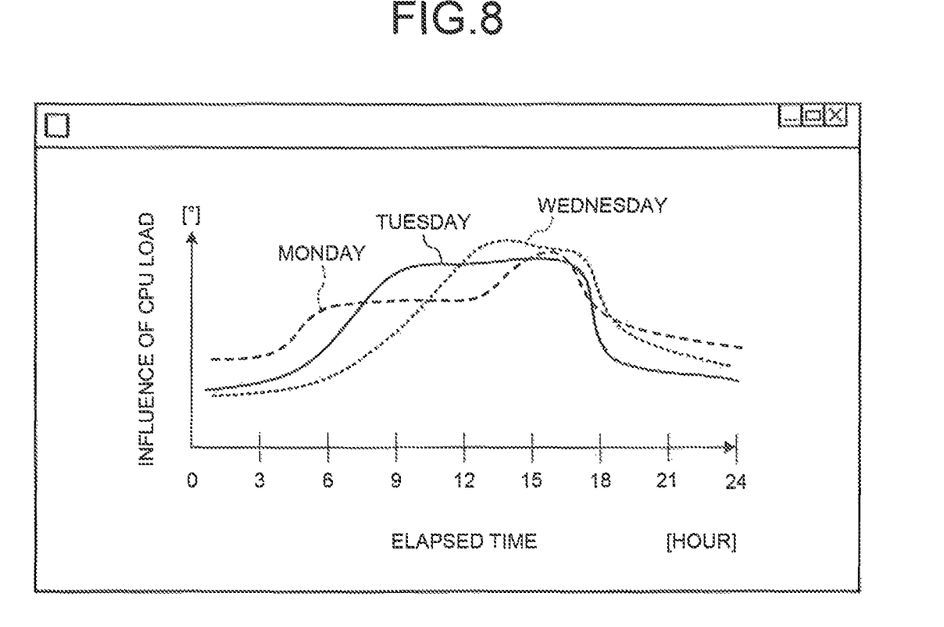
FIG. 8 is a schematic diagram illustrating a further exemplary form of display of the indices calculated by the electronic apparatus according to the first embodiment on the display unit, as different from what are illustrated in FIGS. 5 to 7.

FIG. 7 illustrates a graph showing diurnal changes in the index corresponding to the environmental temperature. FIG. 8 illustrates a graph showing diurnal changes in the index corresponding to the influence of load on the CPU (component 62, heat generating element). The index indicating the CPU load effect in FIG. 8 is, for example, a CPU's temperature. In FIGS. 7 and 8, the abscissa represents elapsed time (hours) and the ordinate represents respective values of the indices. The graphs are marked with indices of Monday, Tuesday, and Wednesday. From the displays of temporal changes in the index values as illustrated in FIGS. 7 and 8, the user can know temporal changes in phenomenon and performance. The user thus can identify a specific period of time during which the phenomenon or performance degrades. Additionally, FIGS. 7 and 8 include different changes over time under different conditions, so that the user can easily identify changes in the phenomenon and performance and causes of the changes.

Figure 9:
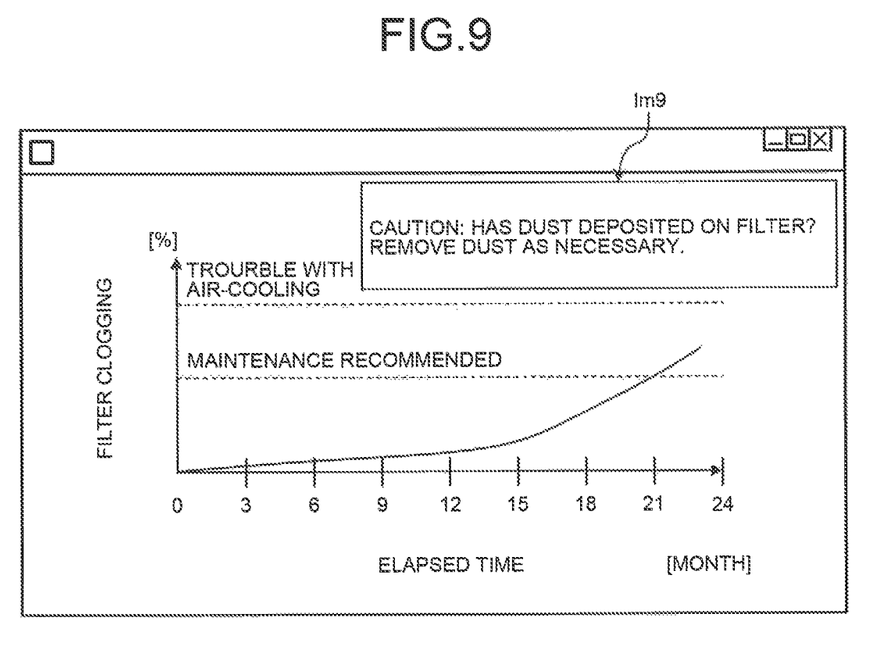
FIG. 9 is a schematic diagram illustrating a still further exemplary form of display of the indices calculated by the electronic apparatus according to the first embodiment on the display unit, as different from what are illustrated in FIGS. 5 to 8.
Figure 10:
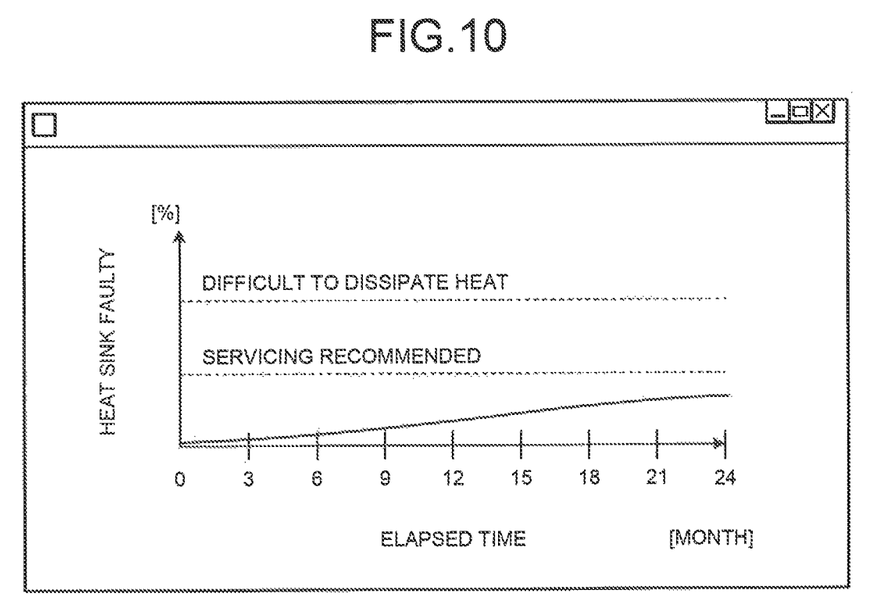
FIG. 10 is a schematic diagram illustrating a yet further exemplary form of display of the indices calculated by the electronic apparatus according to the first embodiment on the display unit, as different from what are illustrated in FIGS. 5 to 9.

FIG. 9 illustrates a graph showing changes over time in the index corresponding to clogging of a filter in two-year use. FIG. 10 illustrates a graph showing changes over time in the index indicating a failure in the heat sink in two-year use. The index indicating clogging of the filter in FIG. 9 may, for example, be defined as a ratio from 0 indicating no clogging to 1 indicating complete clogging on the basis of the air volume, of the fan 10i, The index indicating the failure in the heat sink in FIG. 10 may, for example, be defined as a value of a non-dimensionalized linear function on the basis of the temperature of the heat sink, and takes 0 when the temperature is equal to a first temperature and takes 1 when the temperature is equal to a second value higher than the first value. In FIGS. 9 and 10, the abscissa represents elapsed time (months) and the ordinate represents respective values of the indices. In addition, FIGS. 9 and 10 each show two thresholds: a first threshold for recommending maintenance and a second threshold fir recommending replacement of parts or components because for example, trouble with air cooling or trouble with heat dissipation. From the display of the changes over time in the index values as illustrated in FIGS. 9 and 10, the user can know changes over time in the phenomenon and performance. Additionally, on the basis of the thresholds shown in FIGS. 9 and 10, the user can determine, for example, the state of a phenomenon and levels of performance, urgency of the need for taking measures, and a margin of time for taking measures. Additionally, a system (controller 100) may be able to propose to the user how to and when to perform maintenance of the electronic apparatus 1 or how to properly dispose parts or tools used for maintenance (preparations) according to, for example, user's needs including a mode of use and use environment. It also becomes possible to reflect the indices, acquired data, or analyses of the indices or acquired data in plans or designs of a new model of the electronic apparatus 1 or refer to them for the plans or decisions, for example. The index graph in FIG. 9 exceeds the threshold and the display therein also includes an image Im9 (text, information) to notify a user of occurrence of anomaly and prompt the use to deal with the anomaly.

As described above, in the present embodiment, the calculator 100b (index calculator) calculates the index corresponding to a physical quantity c the index indicating performance of the electronic apparatus 1, on the basis of correlations between the detected values of the sensors 101 and the index. According to the embodiment the indices can indicate changes in phenomenon or performance numerically or in a stepwise fashion. A user can thus earlier or more accurately recognize anomaly or indication of anomaly in the electronic apparatus 1 or in the ambient environment of the electronic apparatus 1, for example.

In the present embodiment, the calculator 100b calculates the index on the basis of the correlations between the detected values of the three or more sensors 101 and the index. Thus, in accordance with the present embodiment, more accurate indices can be calculated, which allows a user to more accurately recognize anomaly or indication of anomaly in the electronic apparatus 1, for example.

In the present embodiment, the calculator 100b calculates, as the index, a sum of products of independent variables and coefficients corresponding to the respective detected values of the sensors 101. Thus, in accordance with the present embodiment, a user can identify possible causes of a phenomenon or a change in performance from a ratio of the product of the independent variable and the coefficient to the index.

In the present embodiment, the sensor 101 that corresponds to an independent variable resulting in a maximum product in the index I1 (=first index) differs from the sensor 101 that corresponds to an independent; variable resulting in a maximum product in the index I2 (=second index). Because of this, in accordance with the present embodiment, more accurate indices can be calculated, which allows a user to further accurately identify anomaly or indication of anomaly in the electronic apparatus 1, for example.

In the present embodiment, the index may correspond to a different physical quantity including, for example, temperature, temperature of a heat generating element or environmental temperature. Additionally, the index may indicate, for example, performance including cooling performance of the cooling element 63 or clogging of the filter 14. Thus, in accordance with the present embodiment, a user can recognize present statuses of and changes over time in various types of phenomena and performance.

In the present embodiment, for example, all of the sensors 101 involved in the calculation of the indices detect temperature. Thus, in accordance with the present embodiment, index calculating devices with a simpler structure can be achieved.

In the present embodiment, the sensors 101 involved in the index calculation include sensors detecting physical quantities different from each other. Thus, in accordance with the present embodiment, for example, various types of sensors can be used for the calculation of the indices. Furthermore, the indices can be calculated more accurately, for example, on the basis of detected values closely correlated with the indices.

In the present embodiment, for example, the sensors 101 are disposed on the substrate 61 housed in the housing 2. Thus, in accordance with the present embodiment, index calculating devices with a simpler configuration can be achieved.

In the present embodiment, the electronic apparatus 1 includes the display controller 100d and the audio controller 100e (output controllers) that control the display 4 and the speaker 5 (output units) to output the indices. Thus, in accordance with the present embodiment, the user can visually or aurally know present statuses of and changes over time in phenomena and performance indicated by the indices.

In the present embodiment, the display controller 100d and the audio controller 100e control the display 4 and the speaker 5 to output the products corresponding to the indices. Thus, in accordance with the present embodiment, the user can recognize possible causes of phenomena or performance indicated by the indices.

Second Embodiment

Figure 11:
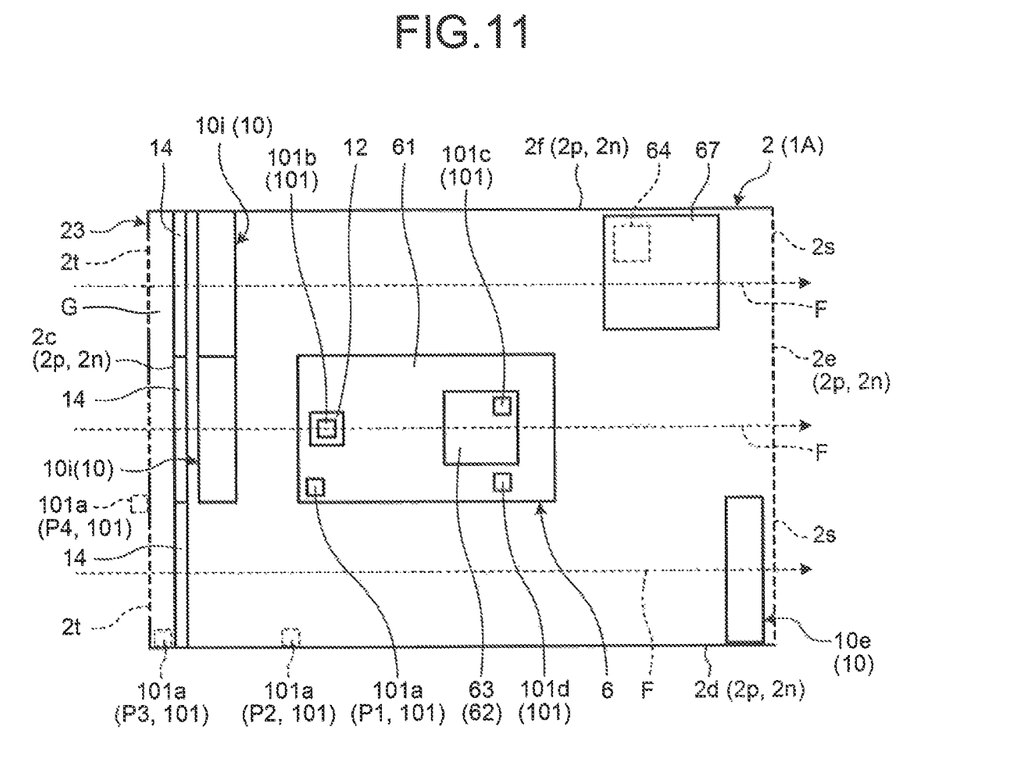
FIG. 11 is a schematic and exemplary plan view of the configuration of elements inside a housing of the electronic apparatus according to a second embodiment.

FIG. 11 is a schematic and exemplary plan view of the configuration of elements inside the housing 2 of an electronic apparatus 1A according to a second embodiment. The electronic apparatus 1A of the present embodiment has the same or like configuration as the electronic apparatus 1 of the first embodiment. The configuration of the second embodiment can thus attain the same or like results and effects as that of the first embodiment.

However, the electronic apparatus 1A of the present embodiment differs from that of the first embodiment in that the housing 2 accommodates a component 67 including the heat generating element 64 but no sensor 101. The component 67 can include multiple heat generating elements 64 instead of the single heat generating element 64 in FIG. 11. The housing 2 may accommodate multiple components 67 each including the heat generating element 64 but no sensor 101. The substrate 61 is one example of a first part on which one of the sensors 101 is disposed and the component 67 is one example of a second part including no sensor 101. The component 62 as a heat generating element mounted on the substrate 61 is one example of a first heat generating element while the heat generating element 64 included in the component 67 is one example of a second heat generating element.

The calculator 100b can calculate an index, which corresponds to the temperature of the heat generating element 64 included in the component 67 with no sensor 101, based on the detected results by the sensors 101 by the expression (2). For the purpose of calculating the index corresponding to the temperature of the heat generating element 64 by the expression (2), the coefficients of the index are acquired and set in advance through experiments or simulation. The index corresponding to the temperature of the heat generating element 64 may be, for example, temperature of a location or a component affected by the heat from the heat generating element 64 and does not need to represent the temperature of the heat generating element 64. The index may also represent a different physical quantity than temperature.

The calculator 100b may also calculate the index corresponding to the temperature of the heat generating element 64 on the basis of another index calculated from the detected values of the sensors 101 by the expression (2). In this case the calculator 100b may calculate an index Isj corresponding to the temperature of the heat generating element 64 by the following expression (3):

$$Isj = bj0 + bj1 I1 + bj2 I2 + \ldots + bjn In \quad (3)$$

where the suffix j (j=1 to m) represents an identifier of the index Is corresponding to the temperature of the heat generating element 64; and bj0, bj1, bj2, ..., and bjn represent coefficients. The coefficients bj0, bj1, bj2, ..., and bjn indicate the correlation between another index I1, I2, ..., In and the index Isj corresponding to the temperature of the heat generating element 64, and are acquired and set in advance through experiments or simulation. The correlation (coefficients) between the index Isj and the index I1, I2, ..., In may be acquired by machine learning technique including Bayesian network, support vector machine, structural equation model, and regression analysis, for example. The index Isj is defined to be a dependent variable having the index I1, I2, ..., In as an independent variable. The index I1, I2, ..., In may indicate a temperature or a different physical quantity (air flux, for example) affecting a temperature. Each term of the polynomial of the index Is may include the power (square, for example) of the index I1, I2, ..., In in place of the index I1, I2, ..., In. In this case the power of the index I1, I2, ..., In is an independent variable. Thus, the index Isj should not be limited to the example above and may be a dependent variable based on the independent variable corresponding to the index I1, I2, . . . , In. If the housing 2 accommodates multiple heat generating elements 64 included in the component 67 with no sensor 101, the calculator 100b can calculate indices corresponding to the temperatures of the heat generating elements 64.

The component 67 including the heat generating element 64 but no sensor 101 is exemplified by a power unit or a storage unit. The storage unit can be, for example, HDD, SSD, redundant arrays of inexpensive disks (RAID) card, local area network (LAN) card, or board. The component 67 can also be an option, an aftermarket add-on part, a replacement part, a competitor's part, or a tamper-proof part all of which are often provided with no sensor 101. The electronic apparatus 1A of the present embodiment can thus estimate the thermal influence on the respective elements from the heat generating element 64 provided in the component 67 with no sensor 101 or having difficulty in including the sensor 101.

To ensure product reliability, designing before shipment and maintenance after shipment are both essential. Before shipment, for example, an electronic apparatus cart be designed to include a cooling mechanism as a fan, with the thermal influence of a heating element on the other elements taken into account. There are two post-shipment maintenance systems, that is, time-based maintenance (TBM) and condition based maintenance (CBM). TBM does not reflect the actual usage state of a product, hence, cannot estimate degradation thereof. This may lead to replacing a sufficiently usable product with a new one or continuously using a degraded product approaching its longevity. Meanwhile, conventional CBM may lower the operation speed of a system or terminate the system depending on a thermal threshold. Under such conventional CBM, however, there may occur an event called silent failure that anomaly arises from an unmonitored element without issuing an error message while a representative value (detected value of a monitored element) remains below a threshold, resulting in the situation that the monitored element exceeds the threshold at an earlier timing than expected. The conventional CBM does not effectively work for the component 67 with no sensor 101. In this regard, the electric apparatus 1A of the present embodiment can offer more reliable CBM to the component 67 with no sensor 101 or to other parts thermally affected by the heat generating element 64 of the component 67 than the conventional CBM.

Figure 12:
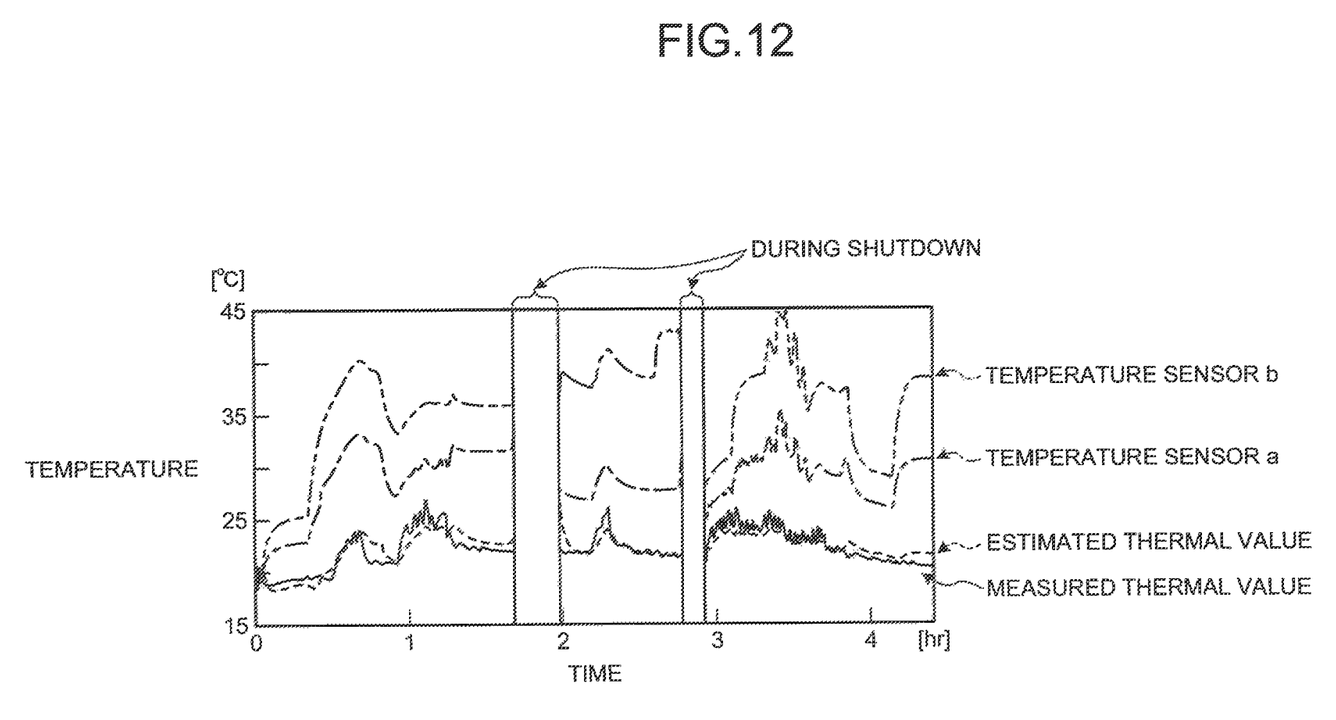
FIG. 12 is a time chart illustrating one example of detected values of two temperature sensors, an estimated value calculated based on the detected values of the temperature sensors, and a measured value according to the electronic apparatus of the second embodiment.

FIG. 12 is a time chart illustrating an estimated thermal value at a certain location outside the housing 2 calculated based on the detected values of the four sensors 101 of the electric apparatus 1 and a measured thermal value at the certain location by way of example. The chart in FIG. 12 includes the results (independent variables) of detection by two temperature sensors a and b of the four sensors 101. It can be seen from FIG. 12 that the temperature (as one example of index) at the outside location with no sensor 101 provided can be relatively precisely estimated.

While certain embodiments nave been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fail within the scope and spirit of the inventions.

What is claimed is:

1. An electronic apparatus comprising:
   a housing;
   a heat generating element accommodated in the housing;
   three or more sensors;
   a calculator configured to calculate a dependent variable by a polynomial including three or more independent variables respectively corresponding to detected values of the three or more sensors; and
   an output controller configured to control an output unit to output the dependent variable, wherein
   by using the dependent variable, a change in a temperature, in performance, or in a physical quantity affecting the temperature is identified;
   the housing accommodates a first part including a sensor and a second part including no sensor;
   the heat generating element includes a first heat generating element disposed in the first part and a second heat generating element disposed in the second part; and
   the calculator calculates a dependent variable corresponding to a temperature of the second heat generating element in the second part, based on a sum of products of another dependent variable and coefficients, the another dependent variable being calculated from the detected values of the three or more sensors.

2. The electronic apparatus according to claim 1, wherein the dependent variable is compared with a threshold.

3. The electronic apparatus according to claim 1, wherein the polynomial includes a sum of products of the three or more independent variables and predetermined coefficients corresponding to the respective independent variables.

4. The electronic apparatus according to claim 3, wherein the polynomial includes the sum of products of the independent variables and the coefficients; and
   one of the sensors that corresponds to one of the independent variables resulting in a maximum product in a first dependent variable differs from one of the sensors that corresponds to one of the independent variables resulting in a maximum product in a second dependent variable, the second dependent variable being different from the first dependent variable.

5. The electronic apparatus according to claim 1, wherein the dependent variable corresponds to temperature.

6. The electronic apparatus according to claim 1, further comprising:
   a cooling element configured to cool the heat generating element, wherein
   the dependent variable is a dependent variable representing cooling performance of the cooling element.

7. The electronic apparatus according to claim 1, wherein all of the three or more sensors detect temperature.

8. The electronic apparatus according to claim 1, wherein the three or more sensors include sensors configured to detect physical quantities that are different from each other.

9. The electronic apparatus according to claim 1, wherein the calculator calculates, as the dependent variable, a sum of products of independent variables and coefficients corresponding to the respective detected values of the sensors, and
   the output controller controls the output unit to output the products corresponding to the dependent variable.

10. A method for calculating a dependent variable the method comprising:
    acquiring, by an electronic apparatus comprising a housing, a heat generating element accommodated in the housing, three or more sensors, a calculator, and an output controller, detected values of the three or more sensors;

calculating, by the calculator, the dependent variable by a polynomial including three or more independent variables respectively corresponding to detected values of the three or more sensors; and performing control, by the output controller to output the calculated dependent variable, wherein by using the dependent variable, a change in a temperature, in performance, or in a physical quantity affecting the temperature is identified;

the housing accommodates a first part including a sensor and a second part including no sensor;

the heat generating element includes a first heat generating element disposed in the first part and a second heat generating element disposed in the second part; and the calculating calculates a dependent variable corresponding to a temperature of the second heat generating element in the second part, based on a sum of products of another dependent variable and coefficients, the another dependent variable being calculated from the detected values of the three or more sensors.

11. A computer program product including programmed instructions embodied in and stored on a non-transitory computer readable medium, wherein the instructions, when executed by a computer, cause the computer to:

acquire detected values of three or more sensors included in an electronic apparatus that further comprises a housing, a heat generating element accommodated in the housing, a calculator, and an output controller;

calculate a dependent variable by a polynomial including three or more independent variables respectively corresponding to detected values of the three or more sensors; and perform control to output the calculated dependent variable, wherein by using the dependent variable, a change in a temperature, in performance, or in a physical quantity affecting the temperature is identified;

the housing accommodates a first part including a sensor and a second part including no sensor;

the heat generating element includes a first heat generating element disposed in the first part and a second heat generating element disposed in the second part; and the calculating calculates a dependent variable corresponding to a temperature of the second heat generating element in the second part, based on a sum of products of another dependent variable and coefficients, the another dependent variable being calculated from the detected values of the three or more sensors.

12. An electronic apparatus comprising:

a calculator configured to calculate a dependent variable by a polynomial including three or more independent variables respectively corresponding to detected values of three or more sensors; and an output controller configured to control an output unit to output the dependent variable calculated by the calculator included in the electronic apparatus that further comprises a housing, a heat generating element, and the three or more sensors, wherein by using the dependent variable, a change in a temperature, in performance, or in a physical quantity affecting the temperature is identified;

the housing accommodates a first part including a sensor and a second part including no sensor;

the heat generating element includes a first heat generating element disposed in the first part and a second heat generating element disposed in the second part; and the calculator calculates a dependent variable corresponding to a temperature of the second heat generating element in the second part, based on a sum of products of another dependent variable and coefficients, the another dependent variable being calculated from the detected values of the three or more sensors.

\* \* \* \* \*

UNITED STATES PATENT AND TRADEMARK OFFICE
CERTIFICATE OF CORRECTION

PATENT NO. : 11,162,912 B2  
APPLICATION NO. : 15/258228  
DATED : November 2, 2021  
INVENTOR(S) : Tomoyuki Suzuki et al.

It is certified that error appears in the above-identified patent and that said Letters Patent is hereby corrected as shown below:

On the Title Page

Item (73), "KABUSHI KI KAISHA TOSHIBA," should read --KABUSHIKI KAISHA TOSHIBA,--.

Signed and Sealed this  
Twenty-second Day of March, 2022

Drew Hirshfeld  
*Performing the Functions and Duties of the*  
*Under Secretary of Commerce for Intellectual Property and*  
*Director of the United States Patent and Trademark Office*